Figure 1:
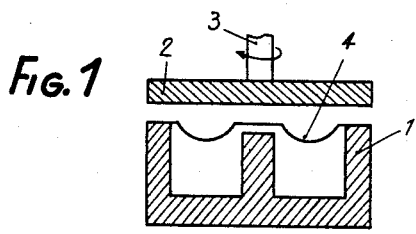

June 24, 1958  P. E. RENAUT  2,840,779
FREQUENCY MODULATION
Filed Sept. 22, 1953  2 Sheets-Sheet 1

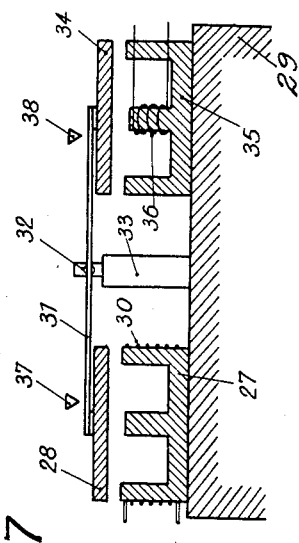
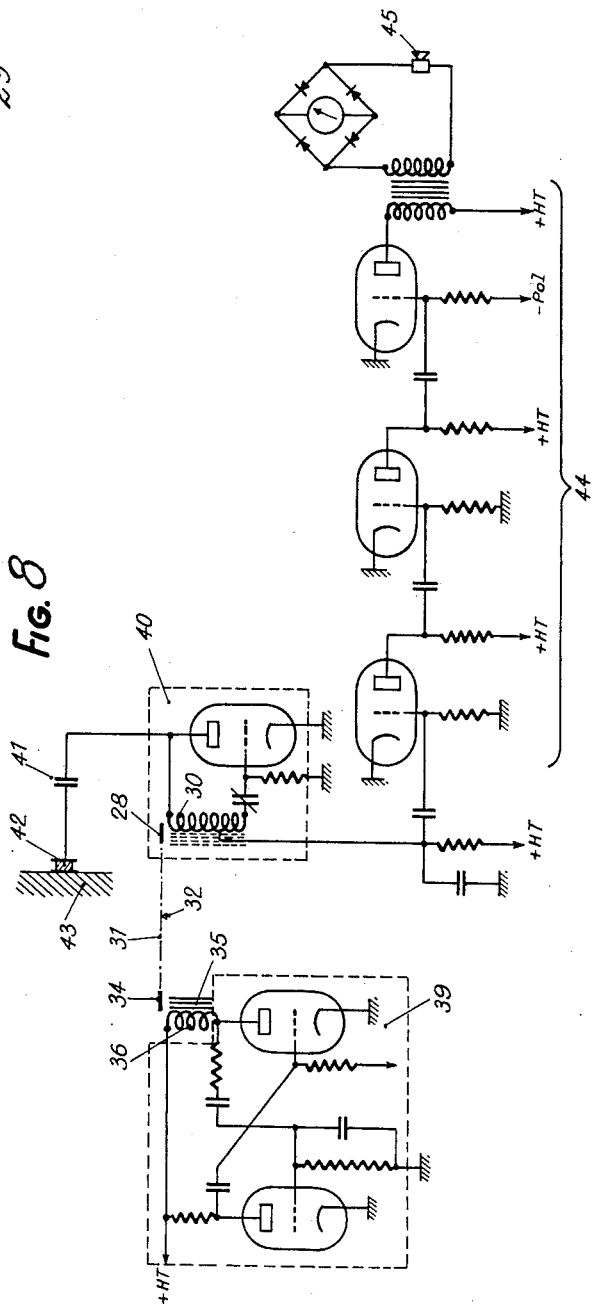
Fig. 7
Fig. 8

United States Patent Office 2,840,779
Patented June 24, 1958

2,840,779

FREQUENCY MODULATION

Paul Emile Renaut, La Varenne-Saint-Hilaire, France

Application September 22, 1953, Serial No. 381,707

Claims priority, application France March 10, 1953

6 Claims. (Cl. 323—90)

The present invention relates generally to the art of frequency modulation and has more particular reference to a novel method for modulating frequency and to an apparatus for utilizing this method.

The method according to the invention is particularly applicable to the testing of metal parts by means of ultrasonic waves but it is more generally applicable wherever the fundamental frequency supplied by a high frequency oscillator requires to be modulated by means of a low frequency, which will be usually an audible frequency, for obtaining the required frequency modulation.

It is already known to test metal parts by means of ultrasonic waves, according to a method in which an electronic variable frequency oscillator, is coupled to a vibration transducer of appropriate type in intimate contact with a surface of the part to be tested in order to determine the resonant frequencies of said vibrations in said body, said frequencies being proportional to the thickness of the body. It is also known for this purpose to modulate the high frequency supplied by the oscillator by means of a low frequency, said modulation being obtained for example by resorting to a capacitor which varies at the low frequency of modulation being considered.

An object of the invention is to provide an improved method of modulating frequency which permits widely separated frequency variations to be obtained.

It is also an object of this invention to provide apparatus capable of utilizing this method and so constructed that the oscillator operates under such conditions as will improve the sensitive of the apparatus.

According to the invention the basic frequency of an oscillator is modulated by means of a magnetic reluctance variation, which causes a variation in the coil effect of the oscillator and, consequently, a variation of the frequency corresponding to the desired modulation.

According to a suitable embodiment of the invention, the winding of the oscillator is coiled about a magnetic core, made for example of sintered magnetic powder, or of magnetic ferrite, such as the material designated by the trade name "Ferroxcube." Variations of the magnetic reluctance is then obtained by modifying the shape or size of the core gap or, alternatively, by saturating the magnetic core by an electric current the characteristic curve of which may have any practical shape.

The magnetic core may, for instance, be in the form of a partly closed cup or trough, and includes a movable element, the displacement of which results in variation of the magnetic reluctance. Such variation may be obtained by providing the stationary element of the core with suitably distributed notches and by revolving a movable element over said stationary element, said movable element being also notched, and the core gap being altered by angularly moving the notches toward or away from one another. Alternatively, the movable element may be so mounted as to be shiftable toward or away from the stationary element. According to another possible modification, a screen made of a magnetic or non-magnetic material and matching a theoretical variation of the gap may be interposed between the two elements.

The invention also provides apparatus for utilizing the above method of frequency modulation, the apparatus comprising a vibration transducer, coupled to a vacuum tube frequency modulated oscillator. Provided in the oscillator tuned plate circuit is a visible or audible indicator connected to said circuit by a resistor-capacitor amplifier, the function of which is to amplify the variations in the plate current of the oscillator arising from the absorption of additional energy which occurs for all resonance frequencies of a metal part being tested, thereby emitting for example, in the audible indicator (which may be constituted either by a headphone or by a loud speaker or by any equivalent contrivance) a sound whose tonality and intensity vary in terms of the metal part.

According to an embodiment of the apparatus of the invention the plate circuit of said frequency modulated oscillator includes an inductance and a capacitance, said inductance comprising a first magnetic member, a coil wound around said member, a second magnetic member, the two members being approximately bodies of revolution around a common axis, said second member being periodically rotated around said axis and the two members having notchese distributed around their common axis, whereby the inductance, and therefore the frequency of the oscillator is periodically modulated.

According to a preferred embodiment, the plate circuit of said frequency modulated oscillator includes an inductor and a capacitor, said inductance comprising a first stationary magnetic member, a coil wound upon said member, said coil being connected across said capacitance, a second movable magnetic member carried by a flexible vibratable stem controlled by an electromagnet driven by a low frequency oscillator.

Figure 3:
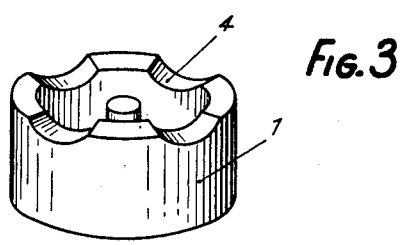
Figure 2:
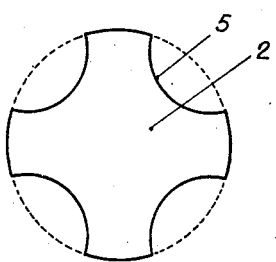
Figure 4:
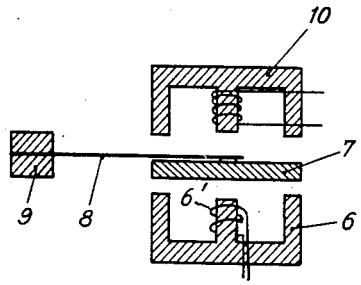
Figure 5:
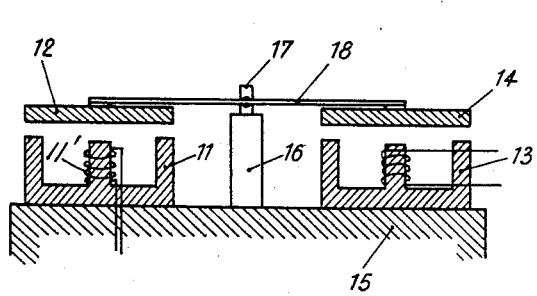
Figure 6:
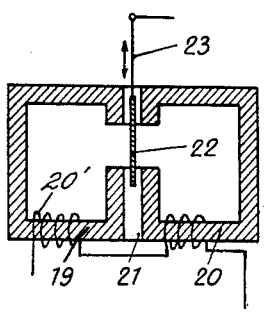

For a better understanding of the invention, reference may be had to the accompanying drawings, wherein:

Figure 1 is a diagrammatic vertical sectional view of a magnetic core of the type adapted to carry the coil of the oscillator for ensuring a frequency modulation by varying the magnetic reluctance, Figure 2 is a plan view of the movable element of this magnetic core, Figure 3 is a perspective view of the stationary element of said core, Figure 4 is a sectional view showing another modification of the magnetic core made up of elements providing a varying gap, Figure 5 is a sectional view showing another possible modification, Figure 6 is a sectional view showing a further modification, including a movable screen, Figure 7 is a vertical view showing diagrammatically a constructional form utilizable for an ultrasonic sounding apparatus using frequency modulation of the type according to the invention, and Figure 8 is a wiring diagram showing the several elements of which an apparatus according to the invention is made up.

Referring to the drawings, and first to Figures 1 to 6, the variation of the magnetic reluctance which supplies the frequency modulation is obtained by coiling the oscillator coil about a magnetic core, which may be made of sintered magnetic powder or magnetic ferrite, for example of the material known under the trade name "Ferroxcube," and by varying the gap of said core.

In the constructional form shown in Figures 1 to 3, the core is in the shape of a closed cup or trough member, comprising a stationary lower element 1 and a movable upper element 2 rigidly connected to an axle 3 by which it is revolved over the element 1. The directed peripheral wall of the stationary element 1 with suitable notches 4.

The movable element is provided with notches 5. It will be understood that such notches 4, 5 combine to permit the gap in the core 1—2 to be varied when the upper element 2 is moved angularly. The shape and distribution of the notches may be so arranged as to provide a variation of the magnetic reluctance according to a given law.

According to the embodiment shown in Figure 4, the magnetic core comprises a stationary cup-shaped lower element 6 and a movable disc-shaped upper element 7 mounted at the top of a flexible blade 8, secured at its other end, at 9, to a stationary carrier. The lower element 6 of the core receives the winding 6' of the high-frequency oscillator. The gap variation, to which a variation of the magnetic reluctance corresponds, is obtained by providing over the upper element 7 an electromagnet 10 which is fed at a suitable frequency. The cyclic energization and de-energization of this electromagnet 10 imparts vibration to the movable element 7 of the core at a corresponding frequency, thereby varying the magnetic reluctance to which the frequency modulation corresponds.

In the constructional modification shown in Figure 5, the magnetic core 11, 12 is made up of two elements and corresponds to the type illustrated in Figure 4. Its stationary lower element 11, which carries the coil 11' of the high frequency oscillator, is secured to a base element 15, which carries a post 16 on which is mounted a resilient device 17 carrying a beam-like rigid bar 18 for mounting the movable element 12. An electromagnet 13, arranged symmetrically to the core 11—12 with respect to the post 16, permits of the obtaining of a vibration corresponding to the modulation frequency to be imparted to the movable unit made up of the elements 12, 14 and the bar 18. The system thus constituted is balanced and insensitive to shocks. It may operate in any desired set position.

The magnetic core having varying reluctance shown by Figure 6 is made up of a pair of elements 19, 20 defining between them a gap 21 for the insertion of a screen 22, made of a magnetic or non-magnetic material, supported by a stem 23 permitting said screen to be further inserted in said gap, or set out therefrom. The carrying stem 23 is actuated at a suitable frequency for varying the magnetic reluctance and obtaining a frequency modulation for the oscillator, the coil 20' of which is wound upon the core 19—20.

The ultrasonic testing apparatus utilizing a frequency modulation by variation of the magnetic reluctance according to the invention, shown by Fig. 9, includes known elements combined with a device of the type shown by Figure 7. This device, which is generally similar to the one shown by Figure 5, comprises a magnetic core made up of a pair of elements 27, 28, the stationary element 27 being secured to a base member 29 and carrying the oscillator coil 30. The movable element 28 is fixed to a beam-like rigid bar 31 supported midway of its length by a steel pin 32 rigidly secured at its ends to posts 33 extending upwardly from the base member 29 and operating by a torsional strain. The bar 31 carries at its other end the yoke armature 34 of an electromagnet 35, the winding 36 of which is energized by an oscillator tuned to the mechanical resonance frequency of the unit. When the electromagnet 35 is energized at this modulation frequency, the movable unit 34—31—28 oscillates and causes a gap variation of the core 27—28 while modifying the magnetic reluctance and consequently modulating the frequency of the main oscillator which feeds the crystal piece of the feeler. Rubber stops 37, 38 are provided for limiting the vibratory motion of the movable unit.

The apparatus having the aforesaid construction is highly sensitive and capable of satisfactorily operating and as none of its members undergoes substantial friction, its wear is practically negligible. Furthermore, its construction is relatively simple and sturdy. The absence of any motor or prime mover, also of any revolving part, completely eliminates parasitic noises and permits the operation to take place at a maximum gain which is exclusively restricted by the amplifier blast. Besides, as the oscillator always operates with a minimum capacity and consequently with a maximum Q factor, the resultant sensitiveness is very large. Consequently, the apparatus permits frequency modulations of the order of 50% or more to be obtained.

A constructional form of this apparatus is represented in Figure 8 which shows a low frequency oscillator 39 including a pair of thermionic valves feeding the coil 36 of the electromagnet, which imparts an oscillatory movement to the bar 31 for modulating, as above described, the frequency of a high frequency oscillator 40, which feeds, through a condenser 41, the quartz piece 42 of the vibration transducer, applied to the metal part 43 to be tested. The coil 30 of the high frequency oscillator 40 is connected in known manner by an amplifier 44 (of the three-stage type in the present example) to a loud speaker 45, which supplies an audible indication, thereby permitting the resonance frequencies in the metal part 43 to be ascertained.

Minor constructional details may be varied without departing from the ambit of the invention within the scope of the appended claims.

Having thus disclosed my invention what I claim as novel and wish to secure by Letters Patent is as follows:

1. Apparatus for modulating frequency, comprising a magnetic core composed of two parts, one of said parts being movable relatively to the other part, an oscillator coil carried by one said part, an electromagnet having its winding fed by a low frequency oscillator, and a rigid bar pivotally mounted intermediate its ends, said bar carrying the movable core element at one end and carrying the electromagnet armature at its opposite end, said bar having a resonant frequency which is substantially equal to the frequency of said low frequency oscillator and being balanced in its pivotal movement.

2. In a variable inductor in combination, a base member; an element movably mounted on said base member between the ends thereof; a magnetic core having a stationary part and a movable part, said stationary part being mounted on said base member and said movable part being mounted on one end of said element and spaced from said stationary part to form an air gap therebetween; and means cooperating with the other end of said movable element for moving the same and repeatedly and alternately changing the air gap between said movable and stationary parts at a predetermined rate to change the effective inductance of said magnetic core at said predetermined rate.

3. In a variable inductor in combination, a base member; an element pivotally mounted on said base member between the ends thereof; a magnetic core having a stationary part and a movable part, said stationary part being mounted on said base member and said movable part being mounted on one end of said element and spaced from said stationary part to form an air gap therebetween; and means cooperating with the other end of said movable element for pivoting the same and repeatedly and alternately changing the air gap between said movable and stationary parts at a predetermined rate to change the effective inductance of said magnetic core at said predetermined rate.

4. In a variable inductor in combination, a base member; an element movably mounted on said base member between the ends thereof; a magnetic core having a stationary part and a movable part, said stationary part being mounted on said base member and said movable part being mounted on one end of said element and spaced from said stationary part to form an air gap therebetween; and electromagnetic means having a stationary part mounted on said base member and having an armature mounted on the other end of said movable element and spaced from said stationary part of said electromagnetic means, said electromagnetic means being adapted to be alternately and repeatedly energized whereby said armature thereof is attracted and moves toward said stationary part thereof, and deenergized whereby said armature returns to its spaced position, so that said movable element is moved for repeatedly and alternately changing the air gap between said movable and stationary parts of said magnetic core at a predetermined rate to change the effective inductance of said magnetic core at said predetermined rate.

5. In a variable inductor in combination, a base member; an element movably mounted on said base member between the ends thereof; a magnetic core having a stationary part and a movable part, said stationary part being mounted on said base member and said movable part being mounted on one end of said element and spaced from said stationary part to form an air gap therebetween; and means cooperating with the other end of said movable element for moving the same and repeatedly and alternately changing the air gap between said movable and stationary parts at a predetermined repetition rate to change the effective inductance of said magnetic core at said predetermined repetition rate, said predetermined repetition rate being equal to the mechanical resonant frequency of said movably mounted element, said movable part of said magnetic core mounted thereon and said means cooperating with the other end of said element.

6. In a variable inductor in combination, a base member; an element movably mounted on said base member between the ends thereof; a magnetic core having a stationary part and a movable part, said stationary part being mounted on said base member and said movable part being mounted on one end of said element and spaced from said stationary part to form an air gap therebetween; and electromagnetic means having a stationary part mounted on said base member and having an armature mounted on the other end of said movable element and spaced from said stationary part of said electromagnetic means, said electromagnetic means being adapted to be alternately and repeatedly energized whereby said armature thereof is attracted and moves toward said stationary part thereof, and deenergized whereby said armature returns to its spaced position, so that said movable element is moved for repeatedly and alternately changing the air gap between said movable and stationary parts of said magnetic core at a predetermined repetition rate to change the effective inductance of said magnetic core at said predetermined repetition rate, said predetermined repetition rate being equal to the mechanical resonant frequency of said movable element, said movable part of said magnetic core mounted thereon, and said armature of said electromagnetic means.

References Cited in the file of this patent
UNITED STATES PATENTS

| | | |
|---|---|---|
| 1,972,964 | Wolcott, Jr. | Sept. 11, 1934 |
| 2,137,068 | Valentine et al. | Nov. 15, 1938 |
| 2,334,018 | Mayne | Nov. 9, 1943 |
| 2,522,924 | Branson | Sept. 19, 1950 |
| 2,551,561 | Hickok et al. | May 1, 1951 |
| 2,730,664 | Karlson | Jan. 10, 1956 |
| 2,731,599 | Groeper | Jan. 17, 1956 |
| 2,768,359 | Side | Oct. 23, 1956 |